J. LUTHER.
Truck.

No. 219,867. Patented Sept. 23, 1879.

Witnesses:
J. W. Garner
W. S. D. Haines

Inventor:
J. Luther
per
F. O. Lehmann,
Atty.

UNITED STATES PATENT OFFICE.

JACOB LUTHER, OF JACKSON, MICHIGAN.

IMPROVEMENT IN TRUCKS.

Specification forming part of Letters Patent No. 219,867, dated September 23, 1879; application filed August 19, 1879.

*To all whom it may concern:*

Be it known that I, JACOB LUTHER, of Jackson, in the county of Jackson and State of Michigan, have invented certain new and useful Improvements in Trucks; and I do hereby declare the following to be a full, clear, and exact description of the invention, such as will enable others skilled in the art to which it pertains to make and use it, reference being had to the accompanying drawings, which form part of this specification.

My invention relates to an improvement in trucks; and it consists in catches or projections on the front end of the movable frame to engage with the tongue, whereby the frame is raised upward when the tongue is depressed, and the descent of the frame controlled, but not forced, when the tongue is raised upward, as will be more fully described hereinafter.

Figure 1:
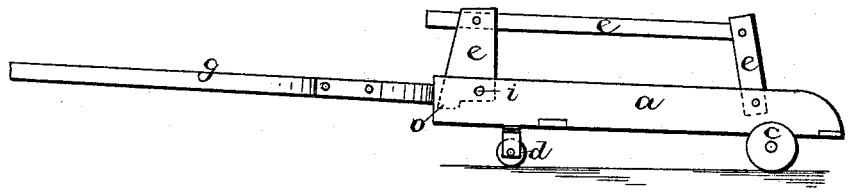
Figure 2:
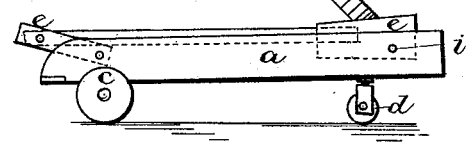
Figure 3:
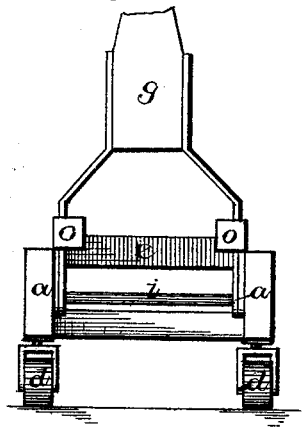

Figure 1 is a side elevation of the truck with the movable frame raised upward. Fig. 2 is a similar view, showing the frame depressed. Fig. 3 is a front view of the truck with the frame depressed.

*a* represents a rectangular frame, made of either wood or iron, which is supported at its rear end by the wheels *c* on a fixed axle, and at its front end by the rollers *d*, which are free to turn in any direction for convenience in turning the truck around. Pivoted inside of this frame is the movable metallic frame *e*, which closes down inside of the frame *a* while being loaded, and which, while loaded, or while the truck is being drawn along, is raised upward, as shown in Fig. 1.

The handle *g* is pivoted in the front end of the frame *a* upon the same pivot or journal, *i*, that the front end of the lower part of the frame *e* turns upon, and this lower end of the frame *e* has a catch, *o*, at each of its front corners, for catching behind the front edges of the rear portion of the handle. When the frame *e* is forced backward these catches *o* draw the handle into an upright position, as shown in Fig. 2; but after the frame has been loaded, or where it is desired to move the truck from place to place unloaded, the very act of drawing the handle down to where it can conveniently be taken hold of raises the frame *e* again and holds it in an elevated position.

By depressing the handle so that its front end reaches to near or rests upon the ground, the frame *e* will be raised up over its center, so that it will remain in that position, no matter how heavy the load is that rests upon it.

When the handle is depressed only to that angle at which the truck can be easily drawn along, the frame *e* is not raised over its center, and hence as soon as the handle is allowed to rise upward the frame sinks downward with its load.

The great advantage in thus connecting the pivoted frame to the handle is, that the operator is given a great leverage-power, and thus he can both raise the weight placed on the truck and lower it again, or hold the load at any height he pleases.

This truck is especially designed for moving stoves, and for holding them in an elevated position while proper supports are being placed under them.

I am aware that a movable frame which is raised upward after the load is placed upon it, and which is connected directly to the handle by a connecting-rod, so that whether the handle is raised or lowered, the frame is compelled to move with it, is old, and this I disclaim.

In my truck the handle or tongue is entirely disconnected from the frame, so that after the frame has been raised up over the center of its pivots it will remain in that elevated position without any help of the handle, and thus the person simply pulls the weight of the truck, and does not have to pull against the backward movement of the load at the same time.

Another advantage is, that the handle can be raised up out of the way while the frame is raised upward without forcing the load back.

Having thus described my invention, I claim—

The combination of the truck *a*, pivoted frame *e*, having the catches *o* on its front end, and the tongue *g*, the parts being constructed and arranged to operate substantially as shown and described.

In testimony that I claim the foregoing I have hereunto set my hand this 11th day of August, 1879.

JACOB LUTHER.

Witnesses:
JNO. G. MUNDY,
EUGENE PRINGLE.